(12) United States Patent
Hamilton et al.

(10) Patent No.: US 11,914,046 B2
(45) Date of Patent: Feb. 27, 2024

(54) EGO-VELOCITY ESTIMATION USING RADAR OR LIDAR BEAM STEERING

(71) Applicant: QUALCOMM Incorporated, San Diego, CA (US)

(72) Inventors: Michael John Hamilton, San Diego, CA (US); Jayakrishnan Unnikrishnan, Jersey City, NJ (US); Urs Niesen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/107,421

(22) Filed: Nov. 30, 2020

(65) Prior Publication Data

US 2022/0171069 A1 Jun. 2, 2022

(51) Int. Cl.
*G01S 17/93* (2020.01)
*G01S 17/931* (2020.01)
*G02B 26/12* (2006.01)
*G01S 7/481* (2006.01)

(52) U.S. Cl.
CPC .......... *G01S 17/931* (2020.01); *G02B 26/123* (2013.01); *G01S 7/4812* (2013.01)

(58) Field of Classification Search
None
See application file for complete search history.

(56) References Cited

U.S. PATENT DOCUMENTS

| 2003/0090408 | A1* | 5/2003 | Matsuura | G01S 7/497 342/107 |
| 2005/0156780 | A1* | 7/2005 | Bonthron | G01S 3/48 342/134 |
| 2016/0161609 | A1 | 6/2016 | Tanaka et al. | |

(Continued)

FOREIGN PATENT DOCUMENTS

| EP | 1478942 B1 | 6/2006 |
| EP | 3539837 | 9/2019 |
| WO | WO 2019042523 | 3/2019 |

OTHER PUBLICATIONS

Grimm C., et al., "Detection of Moving Targets in Automotive Radar with Distorted Ego-Velocity Information", Aug. 2017, DOI: 10.1109/MRRS.2017.8075040, 7 Pages.

(Continued)

*Primary Examiner* — Hovhannes Baghdasaryan
(74) *Attorney, Agent, or Firm* — QUALCOMM Incorporated

(57) ABSTRACT

Methods, systems, computer-readable media, and apparatuses for radar or LIDAR measurement are presented. Some configurations include transmitting, via a transceiver, a first beam having a first frequency characteristic; calculating a distance between the transceiver and a moving object based on information from at least one reflection of the first beam; transmitting, via the transceiver, a second beam having a second frequency characteristic that is different than the first frequency characteristic, wherein the second beam is directed such that an axis of the second beam intersects a (Continued)

ground plane; and calculating an ego-velocity of the transceiver based on information from at least one reflection of the second beam. Applications relating to road vehicular (e.g., automobile) use are described.

21 Claims, 11 Drawing Sheets

(56) References Cited

U.S. PATENT DOCUMENTS

2018/0356511 A1  12/2018  Buddendick et al.
2020/0096626 A1   3/2020  Jian
2021/0150922 A1*  5/2021  Kanagarajan ........ G08G 5/0026

OTHER PUBLICATIONS

Kellner D., et al., "Instantaneous Ego-Motion Estimation using Doppler Radar", DOI: 10.1109/ITSC.2013.6728341, Oct. 2013, 7 Pages.
International Search Report and Written Opinion—PCT/US2021/052663—ISA/EPO—dated Dec. 22, 2022.

* cited by examiner

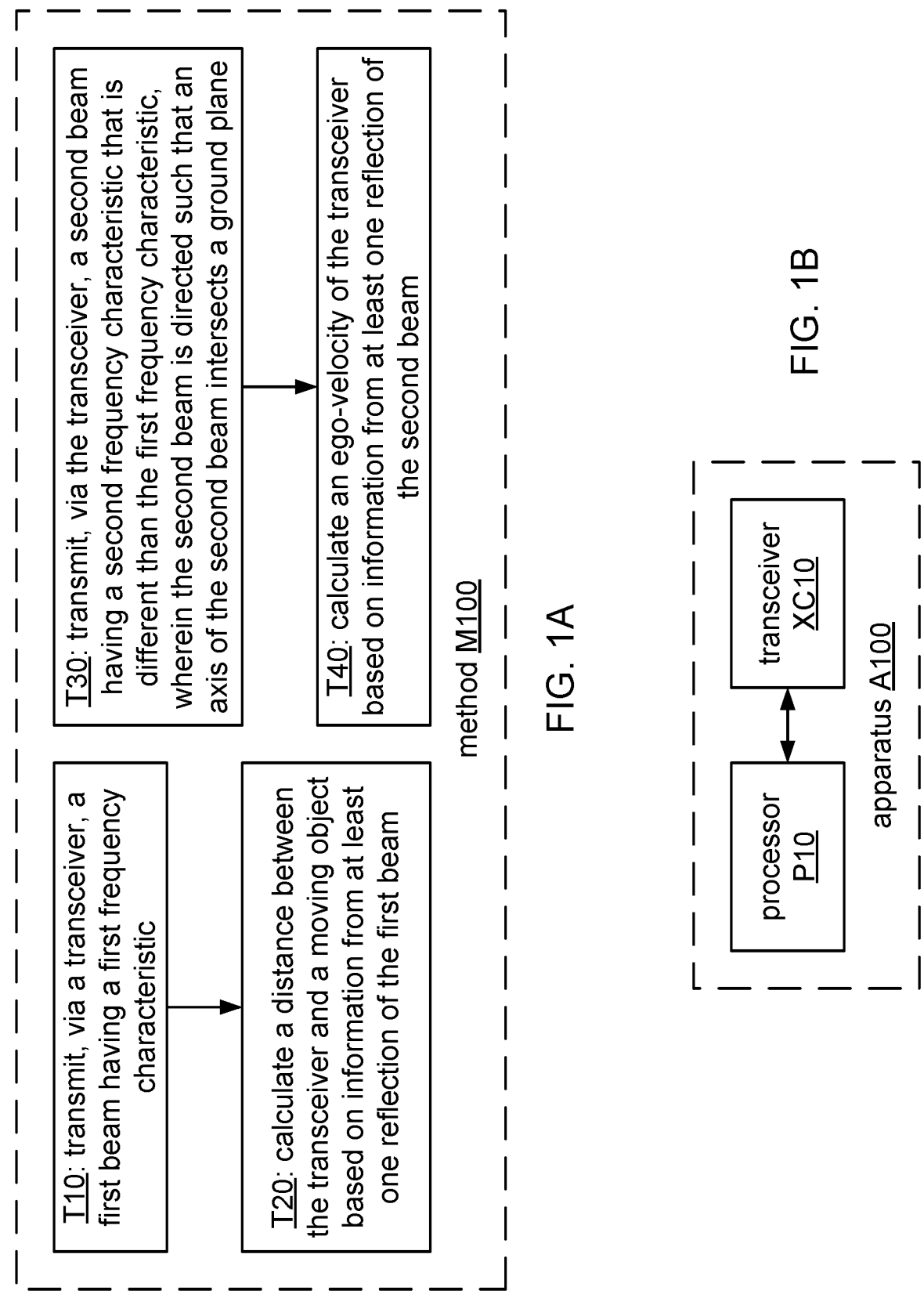

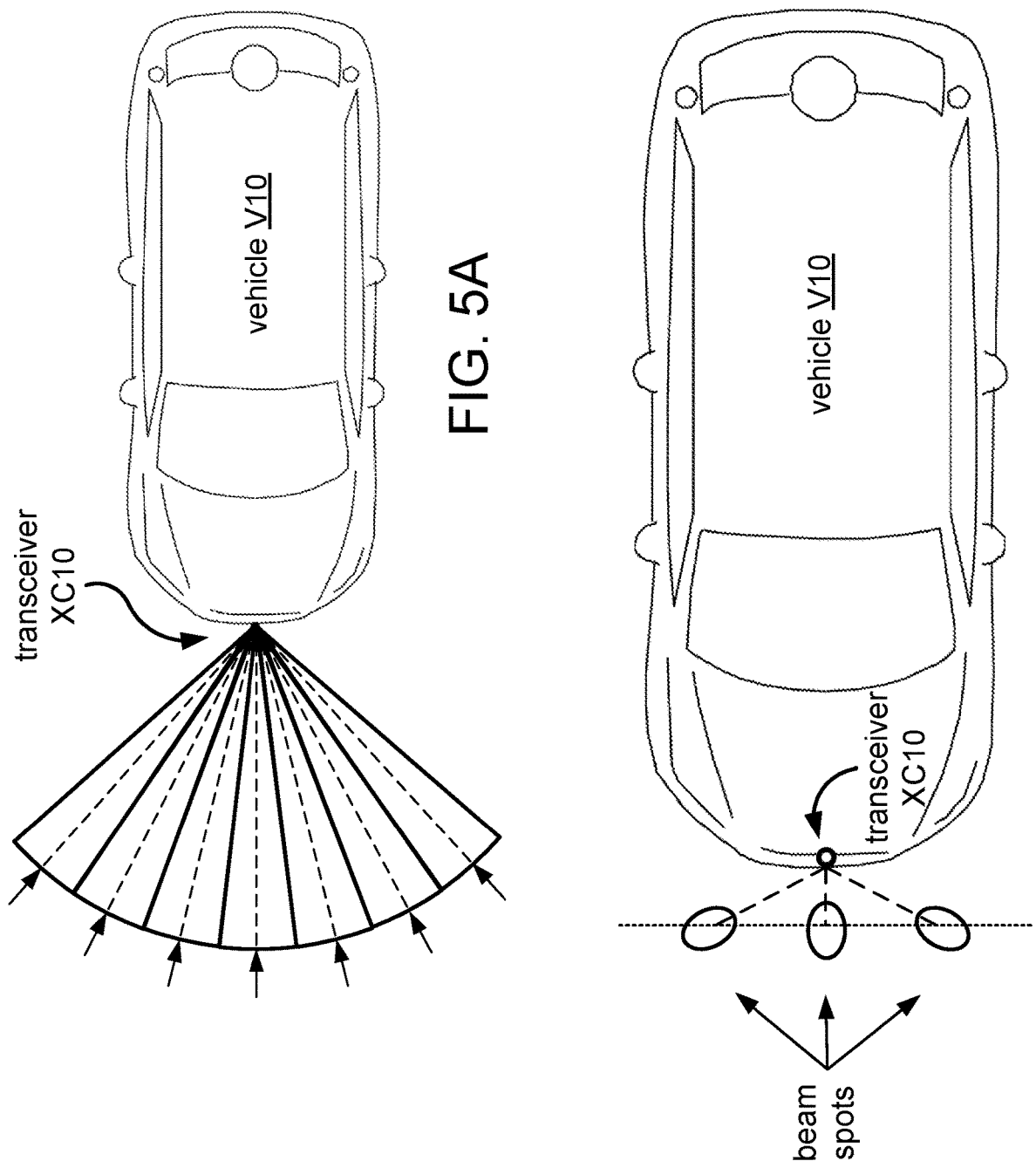

EGO-VELOCITY ESTIMATION USING RADAR OR LIDAR BEAM STEERING

FIELD OF THE DISCLOSURE

Aspects of the disclosure relate to radar or LIDAR-based sensors for powered ground vehicles.

BACKGROUND

Radar signals—or in general electromagnetic signals—are often used for detecting the presence of objects in a surrounding environment. For example, motor vehicles are sometimes equipped with a radar unit that transmits a radar signal in order to detect a corresponding signal reflected off another object such as a nearby vehicle. Using such radar signals for velocity estimation of the motor vehicle itself (i.e. the vehicle equipped with the radar unit) can be challenging. The velocity of the vehicle equipped with the radar unit is also referred to as ego velocity.

BRIEF SUMMARY

A method of radar measurement according to a general configuration includes transmitting, via a transceiver, a first beam having a first frequency characteristic; calculating a distance between the transceiver and a moving object based on information from at least one reflection of the first beam; transmitting, via the transceiver, a second beam having a second frequency characteristic that is different than the first frequency characteristic, wherein the second beam is directed such that an axis of the second beam intersects a ground plane; and calculating an ego-velocity of the transceiver based on information from at least one reflection of the second beam. Computer-readable storage media comprising code which, when executed by at least one processor, causes the at least one processor to perform such a method are also disclosed.

An apparatus for radar measurement according to a general configuration includes a transceiver; and a processor communicatively coupled to the transceiver. The processor is configured to transmit, via the transceiver, a first beam having a first frequency characteristic; calculate a distance between the transceiver and a moving object based on information from at least one reflection of the first beam; transmit, via the transceiver, a second beam having a second frequency characteristic that is different than the first frequency characteristic, wherein the second beam is directed such that an axis of the second beam intersects a ground plane; and calculate an ego-velocity of the transceiver based on information from at least one reflection of the second beam.

BRIEF DESCRIPTION OF THE DRAWINGS

Aspects of the disclosure are illustrated by way of example. In the accompanying figures, like reference numbers indicate similar elements.

FIG. 1A shows a flow chart of a method M100 for radar measurement according to a general configuration.

FIG. 1B shows a block diagram of an apparatus A100 for radar measurement according to a general configuration.

FIG. 5A shows examples of different azimuth angles of a receive radar beam ranging from about minus 45 degrees to about plus 45 degrees relative to the forward axis.

FIG. 5B shows an example in which measurements of a reflected beam are obtained for three different azimuth angles.

DETAILED DESCRIPTION

Figure 2A:
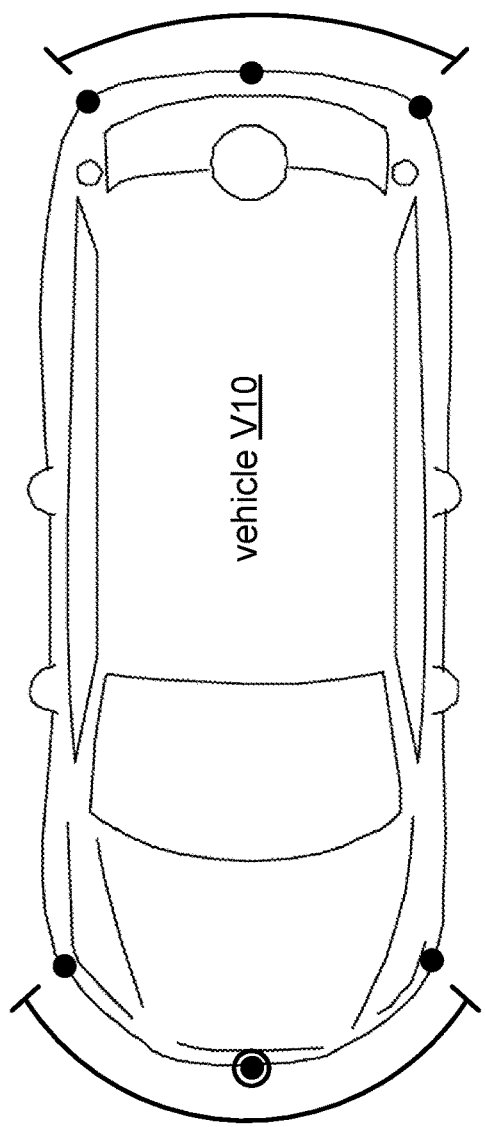
FIG. 2A shows examples of ranges within which a transceiver may be located at the front and/or rear of a vehicle.

One primary task for vehicular automation is environment tracking, which includes object ranging and may also include estimating the positions and velocities of static and dynamic targets (obstacles, other vehicles, pedestrians, etc.) relative to the ego vehicle, i.e. the vehicle tracking the environment. The use of vehicular radar is becoming increasingly prevalent, and a modern road vehicle (e.g., an automobile or passenger car, a truck) is usually equipped with one or more radar sensors for environment tracking. Typically, these radar sensors are used to measure range and relative velocity (through Doppler measurement) of static and dynamic targets (obstacles, other vehicles, pedestrians, etc.) surrounding the ego vehicle. For example, a radar sensor may be used to detect the speed, range, and/or direction of objects (e.g., other vehicles, bicyclists, pedestrians, road features or obstacles) in the vicinity of the vehicle. Such detection may be used to support features such as assisted driving (e.g., adaptive cruise control), collision avoidance (e.g., emergency brake assist), and/or autonomous driving.

Another primary task for vehicular automation is ego localization, which estimates the position and velocity of the ego vehicle in a world reference frame. Sensors employed for ego localization may include, for example, inertial measurement units (IMUs), global navigation satellite system (GNSS; e.g., Global Positioning System (GPS)) receivers, cameras (visible light and/or infrared), LIDAR sensors, wheel speed sensors, etc. Each of these sensor types may encounter problems in velocity estimation. Velocity measurements by a wheel speed sensor (e.g., a speedometer) may include error due to tire diameter variations. Such variations arise from changes in, for example, wear, temperature, pressure, and/or vehicle load. Odometric sensors may be inaccurate, especially at low speeds, and also can be affected by drift and slippage. Visual sensors (e.g., cameras, LIDAR sensors) are susceptible to precipitation (e.g., rain, snow, fog) and glare and may not be available in darkness. The relative measurements produced by an IMU (which may include one or more accelerometers, gyroscopes, and/or magnetometers) may be corrupted by bias and require ongoing correction, which is typically performed using an GNSS receiver that may be disabled when a GNSS signal is not available.

It may be desired to obtain a highly accurate ego-velocity estimate that is robust to precipitation and road conditions and immune to lighting conditions. Measurements by a vehicular radar sensor may also contain information about the velocity of the ego vehicle itself, which might be used to solve the ego localization task with increased accuracy and robustness. The aspect of robustness is particularly significant, since the radar is a redundant sensor that has different failure modes than the sensors which are typically employed for ego localization.

Unfortunately, there are several challenges associated with directly using the Doppler measurements of a radar sensor for ego-velocity estimation. First, a radar sensor is typically configured to optimize performance of the environment-tracking task. Specifically, such optimization includes a trade-off between the maximal range that can be unambiguously measured and the maximal Doppler velocity that can be unambiguously measured. A lower radar pulse repetition rate (also called "pulserepetition frequency" (PRF)) increases maximal range but decreases maximal Doppler, and vice versa. Environment-tracking tasks typically require support for ranges of up to at least 100 (one hundred) meters, so that the maximal unambiguous Doppler measurement is usually configured to be quite small: in one example, plus or minus six meters per second (m/s) (about plus or minus fifteen miles per hour (mph)). The resulting highly ambiguous Doppler measurements render the task of ego-velocity estimation challenging.

Second, only radar returns from static targets contain information about the ego-velocity. Returns from dynamic targets constitute outlier measurements for the task of ego-velocity estimation. Particularly in dense traffic, filtering out these outlying measurements can be challenging if not impossible.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Although the particular examples discussed herein relate primarily to passenger vehicles, it will be understood that the principles, methods, and apparatuses disclosed relate more generally to powered road vehicles, including cargo vehicles (e.g., trucks, tractor-trailers), motorcycles, and public transport vehicles (e.g., buses), and also to other ground vehicles (including, for example, farm vehicles), and that uses of these principles in such contexts is specifically contemplated and hereby disclosed.

FIG. 1A shows a flow chart of a method M100 for radar measurement according to a general configuration that includes tasks T10, T20, T30, and T40. Task T10 operates an apparatus to transmit, via a transceiver, a first beam having a first frequency characteristic. The apparatus may be, for example, a radar sensor. Based on information from at least one reflection of the first beam, task T20 calculates a distance between the transceiver and a moving object. Task T30 transmits, via a transceiver, a second beam having a second frequency characteristic that is different than the first frequency characteristic, wherein the second beam is directed such that an axis of the second beam intersects a ground plane (e.g., at a distance of not more than ten meters from the transceiver). The first frequency characteristic and the second frequency characteristic may be, for example, a pulse bandwidth, a pulse duration, a pulse repetition rate, or a pulse shape. Based on information from at least one reflection of the second beam, task T40 calculates an ego-velocity of the transceiver.

In one example of method M100, the apparatus is an environment-tracking radar sensor and is also used to obtain information about the velocity of the ego vehicle itself that can be used to solve the ego localization task with increased accuracy and robustness. The radar sensor is alternatingly operated in two modes: a traditional object-ranging mode and an ego-velocity mode. During the object-ranging mode, which may be implemented in a conventional manner, the radar waveform is optimized for target detection. For example, the radar may be configured to maximize target detections (e.g., to have a low PRF). During the ego-velocity mode, the radar waveform is optimized for ego localization. For example, the radar may be configured to maximize the use of the Doppler measurements for ego localization (e.g., to have a high PRF). The system switches between the environment-sensing mode and the ego-velocity mode several times per second (e.g., in a range of from two, three, four, or five to one hundred, such as ten, twenty, or fifty). The frequency with which these two modes are alternated, and the duration for which each of them is used, can be chosen such that other system requirements (such as update rate and resolution) are met.

Method M100 may also be implemented to include beam steering, such that the radar beam is steered differently in the two modes. During the object-ranging mode, the radar beam may be directed away from the ground and toward the surrounding targets. Whenever the radar is operated in ego-velocity mode, the radar beam may be steered such that its mainlobe is directed to hit the ground directly in front of the ego vehicle. This region is under most circumstances free of any dynamic objects, and it may be expected that confusion from dynamic targets can be avoided. Therefore, the radar returns measured in the ego-velocity mode can be expected to come from static targets and to yield outlier-free information about the vehicle's ego-velocity.

FIG. 1B shows a block diagram of an apparatus A100 (e.g., a radar sensor) for radar measurement according to a general configuration that includes a processor P10 communicatively coupled to a transceiver XC10. Processor P10 (e.g., one or more processors, which may include one or more digital signal processors) is configured to transmit, via transceiver XC10, a first beam having a first frequency characteristic; to calculate, based on information from at least one reflection of the first beam, a distance between transceiver XC10 and a moving object; to transmit, via transceiver XC10, a second beam having a second frequency characteristic that is different than the first frequency characteristic, wherein the second beam is directed such that an axis of the second beam intersects a ground plane; and to calculate, based on information from at least one reflection of the second beam, an ego-velocity of transceiver XC10. For example, processor P10 may be configured to execute computer-executable instructions that cause it to perform such actions. The first frequency characteristic and the second frequency characteristic may be, for example, a pulse bandwidth, a pulse duration, a pulse repetition rate, or a pulse shape. Apparatus A100 may be implemented such that transceiver XC10 includes one or more antennas and performs front-end processing for the radar and processor P10 performs baseband processing for the radar. Apparatus A100 may be installed in a vehicle (e.g., a motorized road vehicle) and may be part of a larger vehicular automation system. Transceiver XC10 may be implemented on one or more substrates, and processor P10 may be implemented on the same substrate as at least a portion of transceiver XC10 and/or on another substrate. For example, processor P10 may include a microcontroller unit (MCU) and/or other logic on the same substrate and/or within the same housing as transceiver XC10. Although apparatus A100 may be implemented as a dedicated radar and/or LIDAR sensor, apparatus A100 may also be implemented as a 5G (e.g., New Radio (NR)) and/or millimeter wave (mmWave) device for telecommunications that can also be used for radio-frequency (radar) and/or LIDAR sensing. Processor P10 may be implemented, for example, as a 5G baseband processor.

A transceiver of a vehicular radar sensor emits pulses (e.g., "chirps") and receives reflections of the pulses from external objects or "targets" (e.g., other vehicles, pedestrians, obstacles). Relative movement between a transceiver and a target may cause a shift in the phase of the return signal at the transceiver from one pulse to the next. This shift (also called a "Doppler shift") is proportional to the velocity of the relative movement in the direction of the beam axis (also called the radial component of the velocity).

If the relative motion of the target is neither toward nor away from the transceiver (e.g., is directly across the transceiver's field of view), then the velocity of the relative motion has little or no radial component. For this reason, to support ego-velocity measurement it may be desired to position transceiver XC10 to receive reflections from the road surface at least mostly along an axis of movement of the vehicle (e.g., in a forward- or rearward-facing direction). FIG. 2A shows examples of ranges within which transceiver XC10 may be located at the front and/or rear of a vehicle V10 (e.g., a passenger car), with several particular candidate locations being indicated by dark circles. In a particular example, transceiver XC10 is located at the center front of the vehicle (e.g., as indicated by the double circle in FIG. 2A).

Figure 2B:
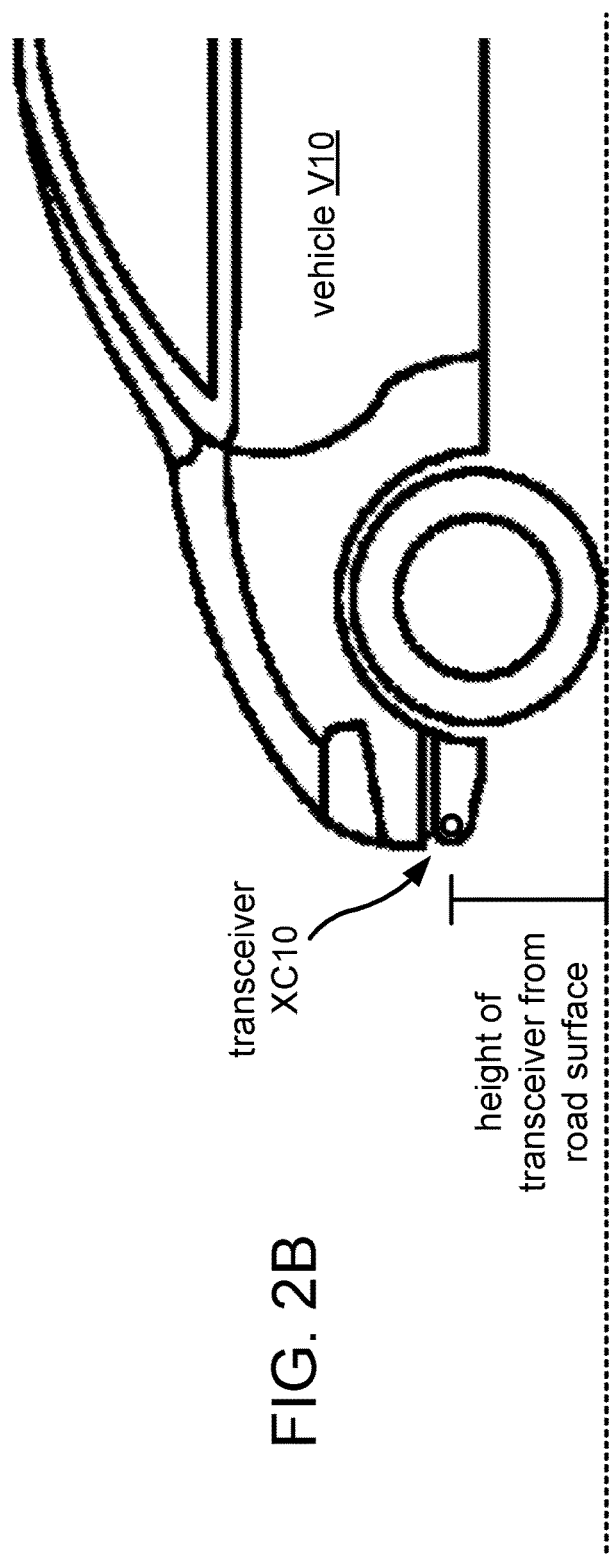
FIG. 2B shows an example of a transceiver located behind a bumper of a vehicle.

Transceiver XC10 may be located at any position that provides a field of view appropriate for environmental sensing (e.g., object ranging) as well as a field of view appropriate for ego-velocity measurement. It may be desired, for example, for the transceiver to be located behind a bumper of the vehicle (e.g., as shown in FIG. 2B). In such case, the bumper may be made of a material (e.g., a resin or other plastic) which is transparent to the beam, or the transceiver may be mounted behind a window in the bumper that is covered with such a material. It may be desired to mount the transceiver at a height from the road surface that is in a range of from 30, 40, or 50 to 50, 60, 75, or 100 centimeters.

Transceiver XC10 may be implemented to transmit at about 77 GHz. For example, transceiver XC10 may be implemented to emit a beam over a range of about 76 to 81 GHz. At these frequencies, the wavelength of the beam is approximately 4 (four) millimeters. Additionally or alternatively, transceiver XC10 may be configured to transmit at other bands, such as a band at about 24 GHz (wavelength approximately 12.5 (twelve-and-one-half) millimeters), or a band at a higher frequency range, such as one hundred GHz or higher. Because a road surface must have sufficient texture depth to provide minimum required friction characteristics under both wet and dry conditions, it may be expected that any road surface will produce sufficient backscatter to support ego-velocity at these beam frequencies.

Figure 3A:
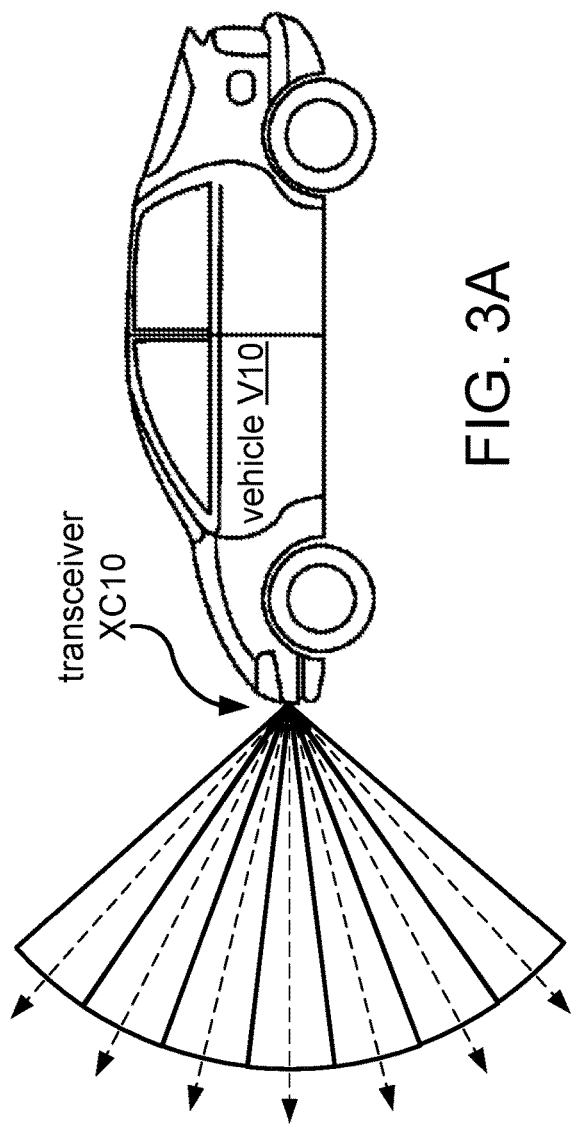
FIG. 3A shows examples of different elevation angles of a mainlobe of a transmit radar beam ranging from about −45 degrees to about +45 degrees relative to horizontal.

A transceiver of a vehicular radar sensor may be configured to transmit a wide beam (also called a "fan beam") at an elevation angle that may be varied over time. FIG. 3A shows examples of different elevation angles ranging from about −45 degrees to about +45 degrees relative to horizontal. Such a beam may have a width in a range of, for example, from 60, 90, or 120 to 120, 150, or 180 degrees and a height in a range of, for example, from five, 10, 20, or 25 to 25, 30, 35, or 45 degrees, and either or both of the width and height may be varied over time. Steering of the beam from one elevation angle to another may be performed in analog circuitry (e.g., by configuring an array of phase shifters) and/or digitally. It is also possible for transceiver XC10 to be configured to transmit more than one beam at a time.

Figure 3B:
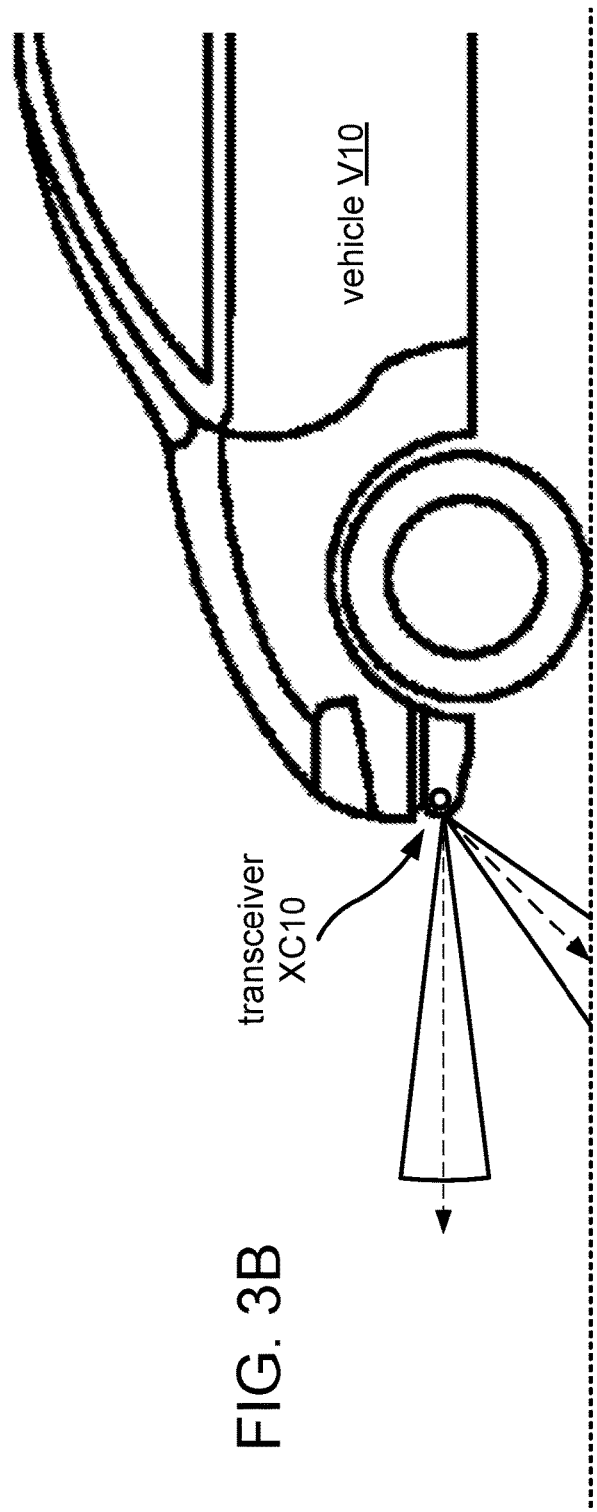
FIG. 3B shows examples of a direction of a transmit beam of a radar sensor in a first mode of operation for object ranging and in a second mode of operation for ego-velocity estimation.

FIG. 3B shows an example of a first mode of operation in which transceiver XC10 emits, at a first time and in a first direction, a beam for object ranging and a second mode of operation in which transceiver XC10 emits, at a second time and in a second direction, a beam for ego-velocity estimation. The axis of the beam for ego-velocity estimation intersects the ground plane on which the vehicle is located. In this example, the beam for object ranging is directed at an elevation angle of zero degrees, and the beam for ego-velocity estimation is directed at an elevation angle of minus 45 degrees. In other examples, the beam for object ranging may be directed at a lower elevation angle (e.g., for detection of objects in the roadway, for curb detection, etc.) or at a higher elevation angle (e.g., for detection of bridges or other overhanging objects, for estimation of another vehicle's height, etc.).

It may be desired for a beam for ego-velocity estimation to have an elevation angle in a range of from minus three, four, five, or ten degrees to minus ten, 20, 30, 40, 45, or 50 degrees. It may be desired, for example, that a beam for ego-velocity estimation is angled downward far enough not to see a vehicle that the ego-vehicle may be following. At an elevation angle of minus five degrees and a transceiver height of 50 centimeters, the beam center is incident on the ground at a distance of about six meters from the transceiver. The elevation of a beam for ego-velocity estimation may be varied over time according to, for example, information indicating a distance to the nearest vehicle along the transceiver's facing direction (e.g., forward or backward). Such information may be obtained during the transceiver's object-ranging mode, by one or more other sensors of the vehicle, from a communication by one or more other vehicles, and/or from a communication by an infrastructure entity.

Figure 4B:
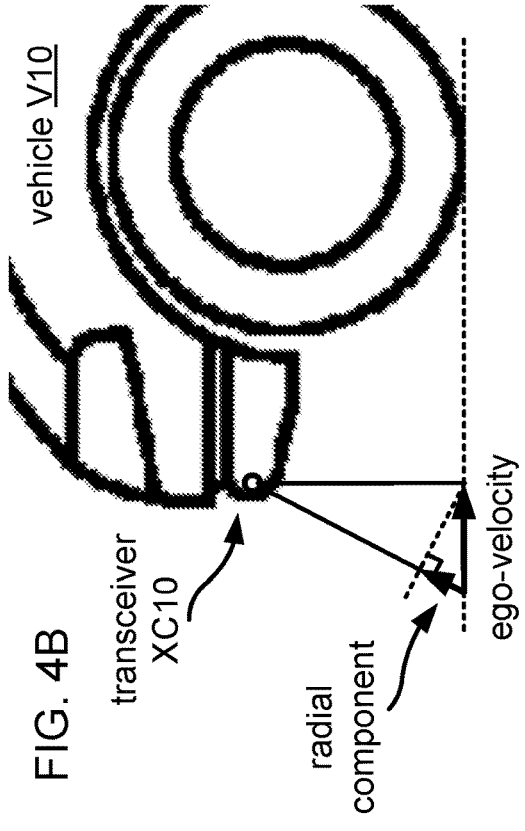
FIGS. 4A-4C show a relation between the magnitudes of the ego-velocity and the radial component of the ego-velocity for different angles of incidence of the radar beam.
Figure 4A:
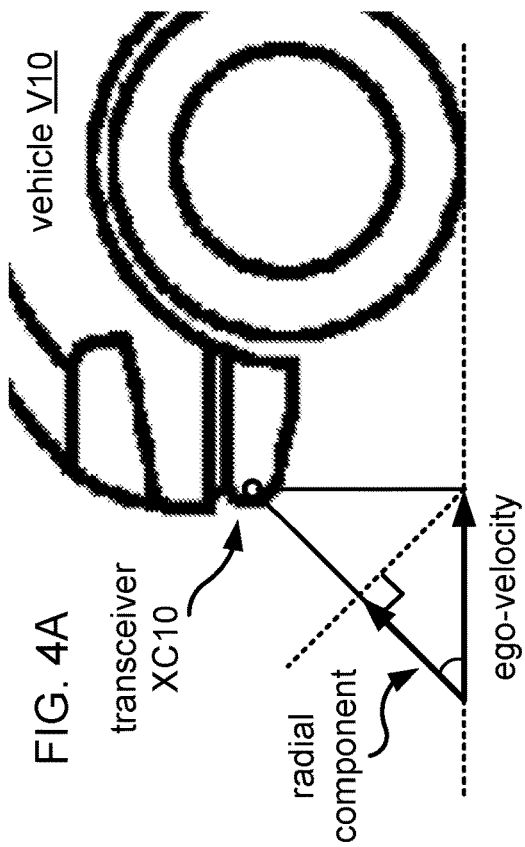
Figure 4C:
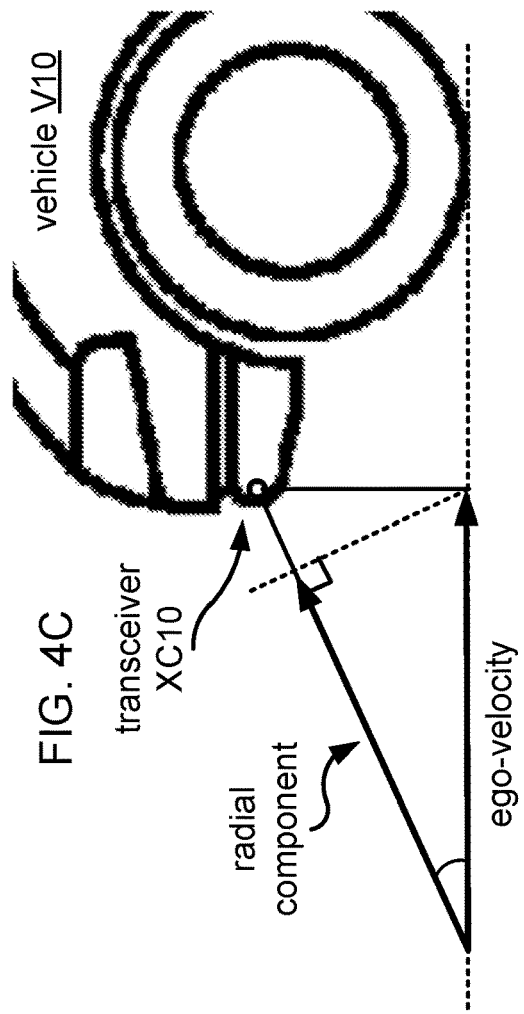

As the elevation angle becomes more negative, the beam's angle of incidence at the road surface increases. As the angle of incidence increases, the amount of backscatter (i.e., the strength of the reflected beam) can be expected to increase. The radial velocity component can be expected to decrease as the angle of incidence increases and may be computed as the product of ego-velocity and the cosine of the angle of incidence. FIGS. 4A-4C show a relation between the magnitudes of the ego-velocity and the radial component of the ego-velocity for different angles of incidence of the radar beam. In the example of FIG. 4A, the angle of incidence is forty-five degrees, and the magnitude of the radial component of the ego-velocity is less than the magnitude of the ego-velocity by a factor of one-half of the square root of two. The example of FIG. 4B shows that the magnitude of the radial component decreases as the angle of incidence increases (approaching zero as the angle of incidence approaches the normal), and the example of FIG. 4C shows that the magnitude of the radial component increases as the angle of incidence decreases (approaching the magnitude of the ego-velocity as the angle of incidence approaches zero).

A vehicular radar sensor is typically configured to receive a reflected beam over a wide azimuth angle and may be configured to process the received signal to create multiple receive beams having different respective widths and/or directions. FIG. 5A shows examples of different azimuth angles ranging from about −45 degrees to about plus 45 degrees relative to the forward axis.

It may be desired for transceiver XC10 to receive information from multiple receive beam spots (e.g., from a plurality of different patches of the road surface) for ego-velocity estimation. For example, it may be desired to estimate components of the ego-velocity vector in more than one direction. FIG. 5B shows an example in which measurements of the reflected beam are obtained for three different azimuth angles: one for a beam spot at a bearing of zero azimuth (e.g., a reflection from a patch of the road surface that is directly below), one for a beam spot at a positive azimuth angle (e.g., a reflection from a patch of the road surface that is below and to the right), and one for a beam spot at a negative azimuth angle (e.g., a reflection from a patch of the road surface that is below and to the left). It may be desired but is not necessary for the absolute azimuth angles of the left and right beams to be equal. It may be desired for the absolute value of the azimuth angle to be in a range of, for example, from two, three, four, or five degrees to five, ten, fifteen, 20, or 25 degrees, and this angle may be based on (e.g., restricted by) a maximum steering angle of the vehicle.

Figure 6A:
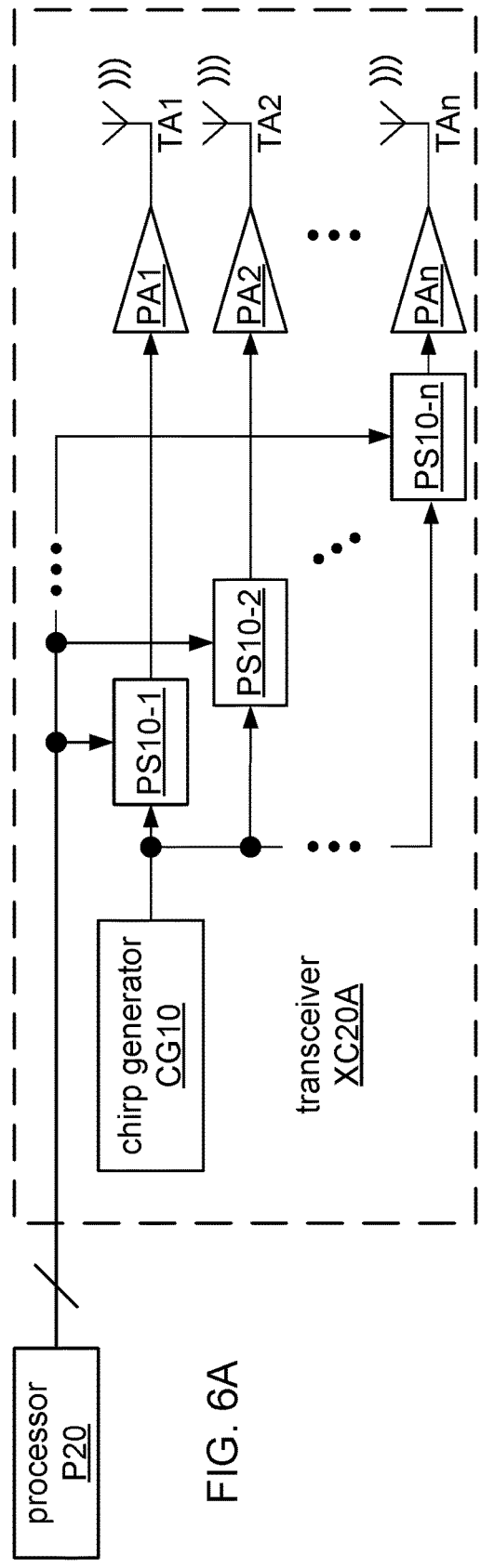
FIG. 6A shows a block diagram that includes an example of a transmitter portion XC20A of transceiver XC20.
Figure 6B:
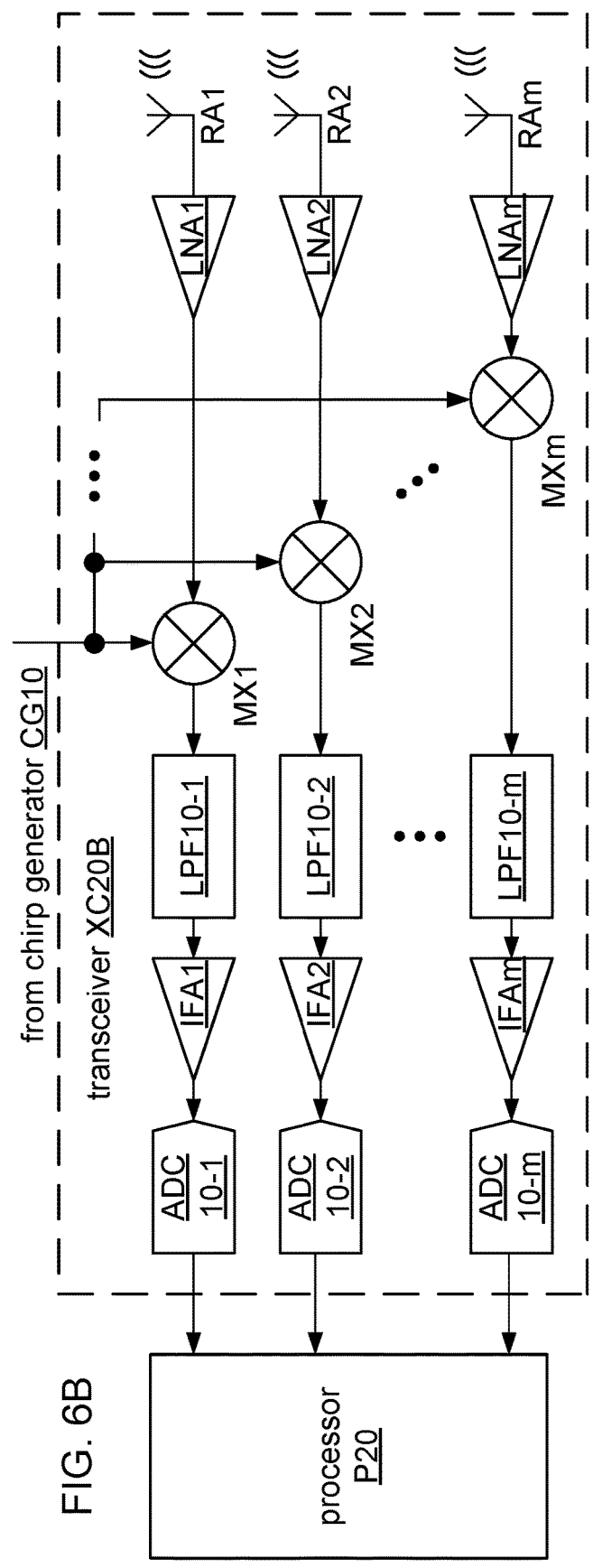
FIG. 6B shows a block diagram that includes an example of a receiver portion XC20B of transceiver XC20.

Apparatus A100 may be implemented to include an implementation P20 of processor P10 and an implementation XC20 of transceiver XC10. FIG. 6A shows a block diagram that includes an example of a transmitter portion XC20A of transceiver XC20, and FIG. 6B shows a block diagram that includes an example of a receiver portion XC20B of transceiver XC20. In these particular examples, transceiver XC20 is a frequency-modulated continuous-wave (FMCW) transceiver, and it includes a chirp generator CG10 that provides the pulse signal to both of the transmitter and receiver portions. The transmitter portion XC20A and receive portion XC20B may be implemented on the same substrate or on different substrates. In other examples, transceiver XC10 may be implemented as part of a pulse-Doppler sensor or as part of a phase-modulated continuous-wave (PMCW) sensor.

Chirp generator CG10 generates pulses as a series of chirps, which vary in frequency as described in more detail below. Transceiver XC20 also includes a transmit array having n transmit antenna elements TA1, TA2, . . . , TAn, and a set of n transmit chains that shapes the generated waveform and drives the transmit array to produce a beam in a desired direction (e.g., elevation angle). In the example of FIG. 6A, each of the n transmit chains includes a respective one of phase shifters PS10-1, PS10-2, . . . , PS10-$n$, which receives a corresponding phase shift value from processor P20 and applies it to the generated waveform. Processor P20 calculates the respective phase shift values based on parameter values such as the beam direction that is currently desired (depending, for example, on whether the sensor is in an environmental-sensing mode or an ego-velocity-estimation mode) and a distance between adjacent transmit antenna elements TA1, TA2, . . . , TAn. Each of then transmit chains also includes a respective one of power amplifiers PA1, PA2, . . . , PAn, which drives a corresponding one of the transmit antenna elements TA1, TA2, . . . , TAn with the phase-shifted waveform. It is understood that each transmit chain may also include one or more other elements, such as one or more filters, baluns, etc. The transmit antenna elements TA1, TA2, . . . , TAn may be arranged as a linear (one-dimensional) array, as a two-dimensional planar array, or in another configuration. The waves produced by the antenna elements interfere constructively and destructively (according to the respective phase shifts) to produce a beam in the direction that is currently desired.

Transceiver XC20 also includes a receive array having m receive antenna elements RA1, RA2, . . . , RAm that receive the reflected pulses (chirps), and a set of m receive chains (where m may be greater than, less than, or equal to n). The receive antenna elements RA1, RA2, . . . , RAm may be arranged as a linear (one-dimensional) array, as a two-dimensional planar array, or in another configuration. In this example, each of the n transmit chains includes a respective one of low-noise amplifiers LNA1, LNA2, . . . , LNAm that amplifies the corresponding received signal; a respective one of mixers MX1, MX2, . . . , MXm that mixes the amplified signal with the waveform generated by chirp generator CG10; a respective one of lowpass filters LPF10, LPF20, . . . , LPFm that blocks a high-frequency image of the corresponding mixed signal to pass a corresponding intermediate-frequency (IF) signal; and a respective one of IF amplifiers IFA1, IFA2, . . . , IFAm. It is understood that each receive chain may also include one or more other elements, such as one or more filters, baluns, etc. A respective one of analog-to-digital converters ADC10-1, 10-2, . . . , 10-$m$ converts the amplified IF signal from the corresponding receive chain to a digital IF signal that is provided to processor P20. In another example, transceiver XC20 performs additional processing on the digital IF signals (e.g., a fast Fourier transform or FFT) before providing them to processor P20.

In the example of FIG. 6B, processor P20 may be configured to perform a beamforming operation on the digital IF signals to produce one or more receive beams in desired directions (e.g., the directions of desired beam spots, as discussed above with reference to FIG. 5B). For example, processor P20 may process the m digital IF signals to obtain, for each of one or more different directions of arrival (DOAs), a corresponding composite signal that represents a beam steered in that direction (e.g., a left beam, a center beam, and a right beam as shown in FIG. 5B). For each desired beam, and similarly to the transmit-side beam direction control, such beamforming typically includes applying a different corresponding phase shift value to each digital IF signal.

In one example, digital signal processor P20 calculates the respective phase shift values based on parameter values such as the desired beam direction, a distance between adjacent receive antenna elements RA1, RA2, . . . , RAn, etc., and the phase-shifted IF signals are summed such that they interfere constructively and destructively (according to the respective phase shifts) to produce a beam in the desired direction. In other examples, different beamforming algorithms may be applied to produce the one or more beam signals from the digital IF signals. In another example, the receive portion of transceiver XC20 may be configured to perform beam steering in the RF domain (e.g., using an array of phase shifters and summing the phase-shifted signals to obtain a receive beam in a desired direction) upstream of the mixing stage. For an implementation of transceiver XC20 that lacks the ability to steer a beam horizontally, it may be desired to direct the beam downward for one-spot measurement for ego-velocity estimation.

Figure 7A:
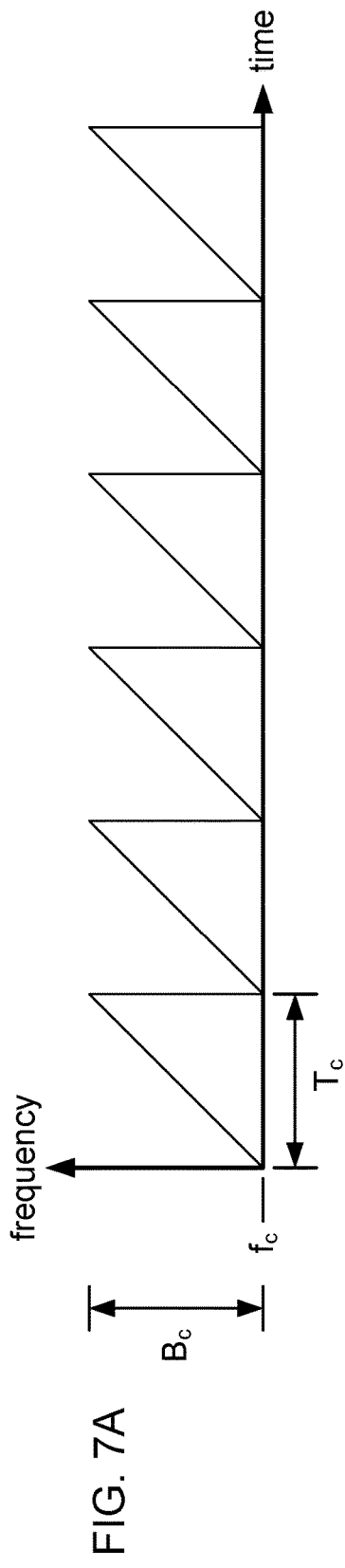
FIGS. 7A-7C shows examples of three different series of linear-frequency-modulated chirps.

Chirp generator CG10 may be configured to produce the pulses as a series of linear-frequency-modulated (LFM) chirps. FIG. 7A shows one example of a series of LFM chirps, each chirp having a sawtooth shape and being characterized by a starting frequency $f_c$, a bandwidth $B_c$, and a duration $T_c$. For a series of LFM chirps of sawtooth form, the IF bandwidth $B_{IF}$ is equal to the maximum frequency shift, which may be calculated from the maximum range $R_{max}$, the chirp bandwidth $B_c$ and the chirp duration $T_c$ according to the following expression, where c is the velocity of light:

$$B_{IF} = \frac{2R_{max}B_c}{cT_c}.$$

For an ego-velocity example in which the chirp bandwidth is 5 (five) GHz, the chirp duration is 50 (fifty) microseconds, and the distance from transceiver to road beam spot is 70 (seventy) centimeters, the IF bandwidth is about 0.5 (one-half) MHz. For an object-ranging example in which the chirp bandwidth is 5 (five) GHz, the chirp duration is 50 (fifty) microseconds, and the maximum desired range is 100 (one hundred) meters, the IF bandwidth is about 33 (thirty-three) MHz. The maximum pulse repetition frequency (PRF) is equal to the reciprocal of the chip duration; the PRF will be lower than this maximum if consecutive chirps of a series are separated by an interval.

The chirp bandwidth may have a value in the range of, for example, one to ten GHz (e.g., one, two, 2.5, three, four, 4.5, or five GHz). The chirp duration may have a value in the range of, for example, one, two, four, or five microseconds to fifty or one hundred microseconds (e.g., ten, twenty, or thirty microseconds). It may be desired to configure apparatus A100 so that the chirp bandwidth is higher for the object-ranging mode than for the ego-velocity mode. Additionally or alternatively, it may be desired to configure apparatus A100 so that the chirp duration is longer for the object-ranging mode than for the ego-velocity mode.

Figure 7B:
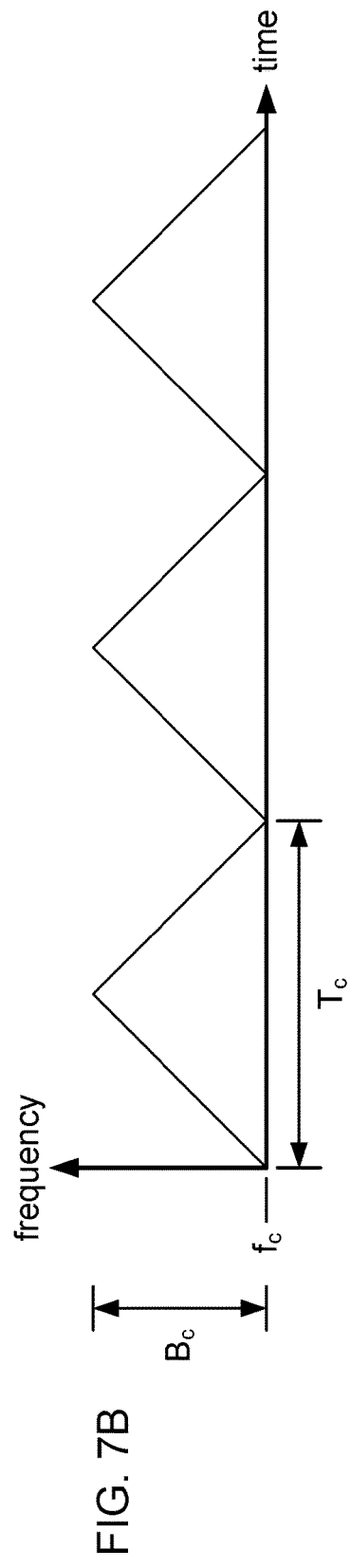
Figure 7C:
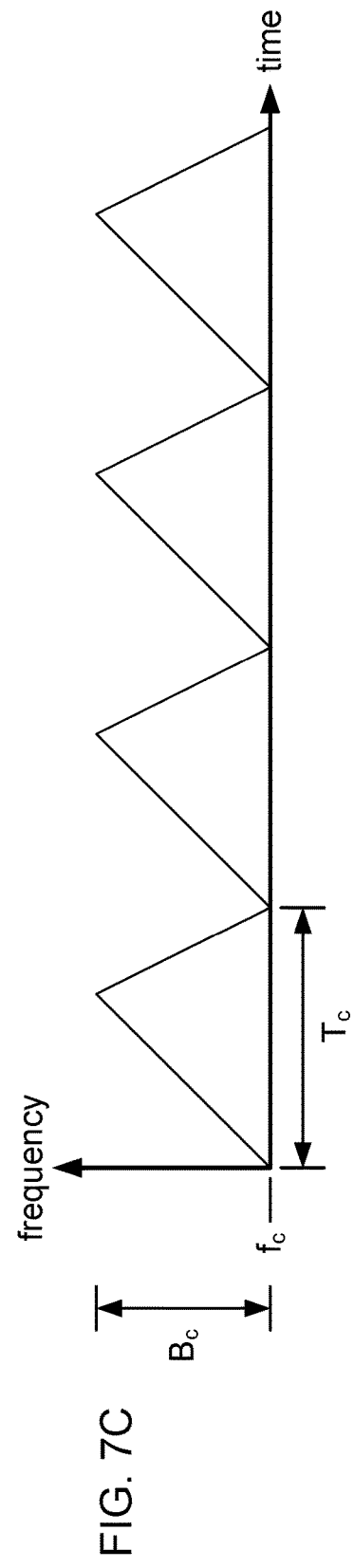

FIG. 7B shows an example of a series of LFM chirps of triangular form in which the rise and fall times of the modulation are equal, and FIG. 7C shows an example of a series of LFM chirps of triangular form in which the rise and fall times of the modulation are not equal. It is also possible to modify any of the chirp waveforms as shown in FIGS. 7A, 7B, and 7C such that one or more of the segments of each chirp of the series (e.g., a rising segment and/or a falling segment) is nonlinear and/or stepped. In one such example, a series of sinusoidal frequency-modulated chirps is used. It may be desired to configure apparatus A100 so that a different form of chirp is used for the object-ranging mode than for the ego-velocity mode.

Figure 8A:
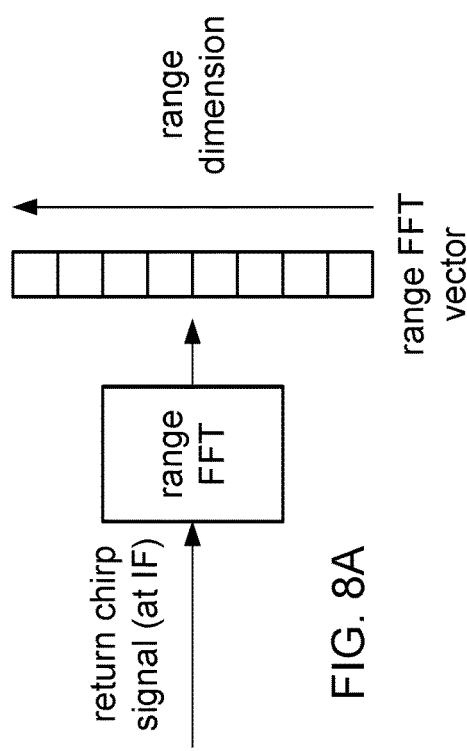
FIG. 8A shows an example of processing a received beam signal at intermediate frequency to obtain range information.

FIG. 8A shows an example of processing a received beam signal at IF to obtain range information. For each return chirp in the signal, processor P10 or transceiver XC10 may be configured to perform a fast Fourier transform (FFT) operation (also called the "range FFT") to obtain a corresponding FFT vector that indicates the ranges of any objects detected by the reflected chirp. Specifically, each component of the range FFT vector represents a different value in a range dimension.

Figure 8B:
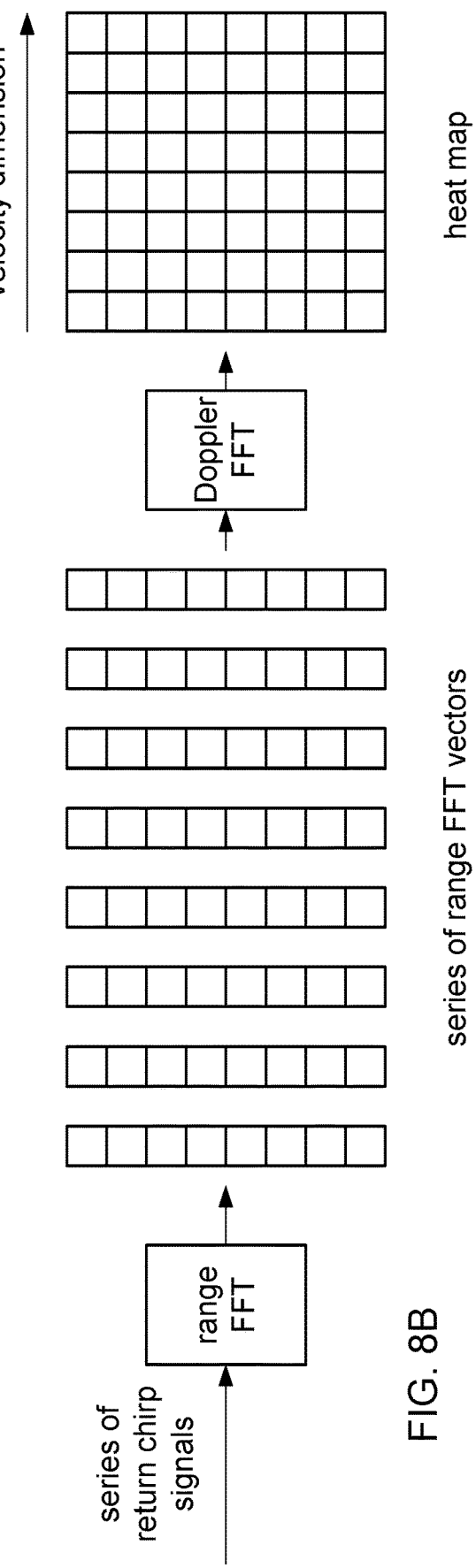
FIG. 8B shows an example of processing a series of range FFT vectors to obtain velocity information.

FIG. 8B shows an example of processing a series of range FFT vectors to obtain velocity information. Processor P10 or transceiver XC10 may be configured to perform a second FFT operation (also called the "Doppler FFT") over the series of range FFT vectors to obtain a two-dimensional array (also called a "heat map") which indicates the radial velocities of the detected objects. Specifically, for each range component in the range FFT vector, the Doppler FFT performs an FFT operation across the series to obtain a corresponding velocity vector for the range component, where each component of the velocity vector represents a different value in a velocity dimension.

Because the velocity information in the heat map is typically indicated by phase differences among the range FFT vectors, it may be desired that the phase of the transmit beam remains coherent across the corresponding series of range FFT vectors. Practically, it may be desired for the series of range FFT vectors to be from a consecutive series of return chirps.

Figure 9:
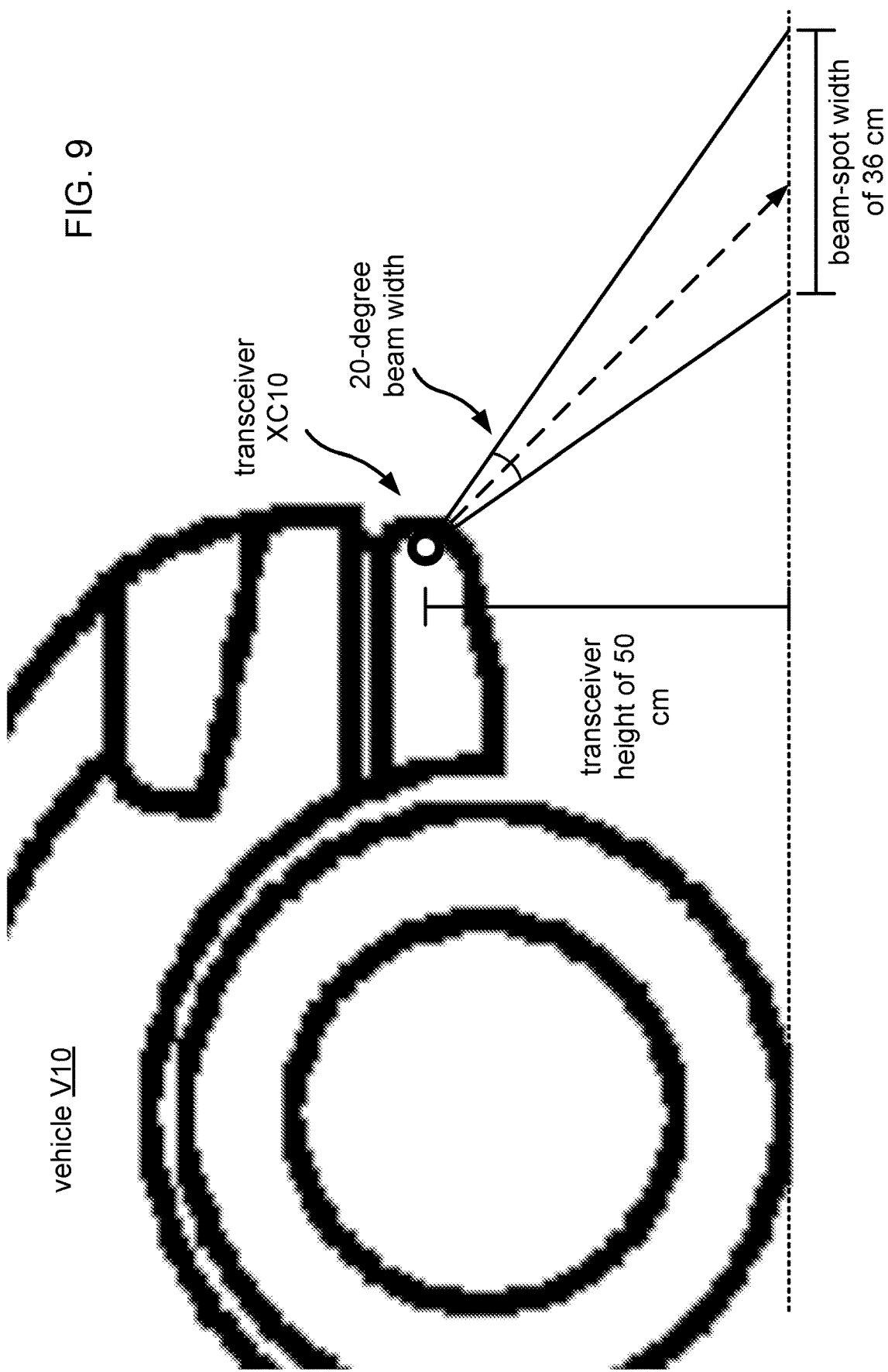
FIG. 9 shows an example of the width of a beam spot at the road surface.

To support an ego-velocity measurement, it may be desired to obtain multiple samples of the return beam from the same patch of road surface. The time available to sample a patch of road surface depends on the size of the patch and on the ego-velocity, and the size of the patch depends on the angle of incidence and width of the beam. FIG. 9 shows an example in which transceiver XC10 is located fifty centimeters above the road surface, the angle of incidence of the beam is forty-five degrees, and the receive beam has a width of twenty degrees. In this example, the width of the beam spot at the road surface is thirty-six centimeters. At a highway speed of seventy miles per hour (about thirty-one meters per second), vehicle V10 will travel this distance in about twelve milliseconds. A radar transceiver operating at a PRF of twenty-five kHz (corresponding to a chirp duration of not more than forty microseconds) over this period will emit about three hundred chirps.

Doppler frequency aliasing may occur during ego-velocity measurement when the radial velocity component of the ego-velocity exceeds the following value:

$$0.5\frac{PRF \times c}{f},$$

where PRF is the pulse repetition frequency, c is the velocity of light, and f is the beam frequency. For an example in which the PRF is twenty-five kHz and the beam frequency is 77 GHz, this value is about fifty meters per second (about one hundred ten miles per hour). For a beam incidence of forty-five degrees, this value corresponds to an unambiguous ego-velocity range of about seventy meters per second (about one hundred sixty miles per hour). For a case in which Doppler frequency aliasing may be a concern for ego-velocity estimation, a velocity estimate from one or more other sensors (e.g., a speedometer) may be used for de-aliasing.

As described above, processor P10 may be configured to cause transceiver XC10 to switch between the object-tracking mode and the ego-velocity mode several times per second (e.g., in a range of from two, three, four, or five to one hundred, such as ten, twenty, or fifty). The frequency with which these two modes are alternated, and the duration for which each of them is used, can be chosen such that other system requirements (such as update rate and resolution) are met. The frequency with which these two modes are alternated may also be varies over time to provide an extremely dynamic approach. For example, a duty cycle among the two modes may be varied according to whether increased environment-tracking, or increased ego-velocity estimation, is desired at a particular time.

Coordination of environment-tracking and ego-velocity sensing modes may also be performed among vehicles that are each equipped with an instance of apparatus A100 and are capable of communicating with one another. For example, a duty cycle among the two modes may be different for different vehicles that are traveling in a cooperative formation (e.g., platooning), with some vehicles (e.g., leaders) using more time share to perform environment sensing (looking up and/or ahead) while other vehicles (e.g., followers) use more time share to perform velocity sensing (looking down). Coordination among vehicles over time and/or frequency to reduce cross-interference is also possible; downward-directed beams for ego-velocity measurement are unlikely to cause interference, for example.

In addition to ego-velocity measurement (e.g., estimation), information from reflections of a receive beam from a road patch may also be used to sense road conditions (such as, for example, road noise estimation and/or detection of negative obstacles (e.g., potholes), transient height variations (e.g., humps), uneven pavement, and/or one or more environmental conditions (e.g., wet road, black ice)) and/or signatures (e.g., road surface roughness characterization). Apparatus A100 may be configured to process one or more received reflections using, for example, deep learning (e.g., a trained neural network) and/or a classical algorithm, to determine one or more such road conditions and/or signatures. Additionally or alternatively, such information may be used to support vehicle localization by detecting, for example, retroreflectors or other lane markings (using, for example, deep learning (e.g., a trained neural network) and/or a classical algorithm).

Although apparatus A100 is described as a radar sensor, the principles disclosed herein may also be extended to implementations of apparatus A100 as a LIDAR sensor that supports beamsteering (e.g., using metamaterials and/or MEMS-based mirrors) and Doppler measurement.

Figure 10:
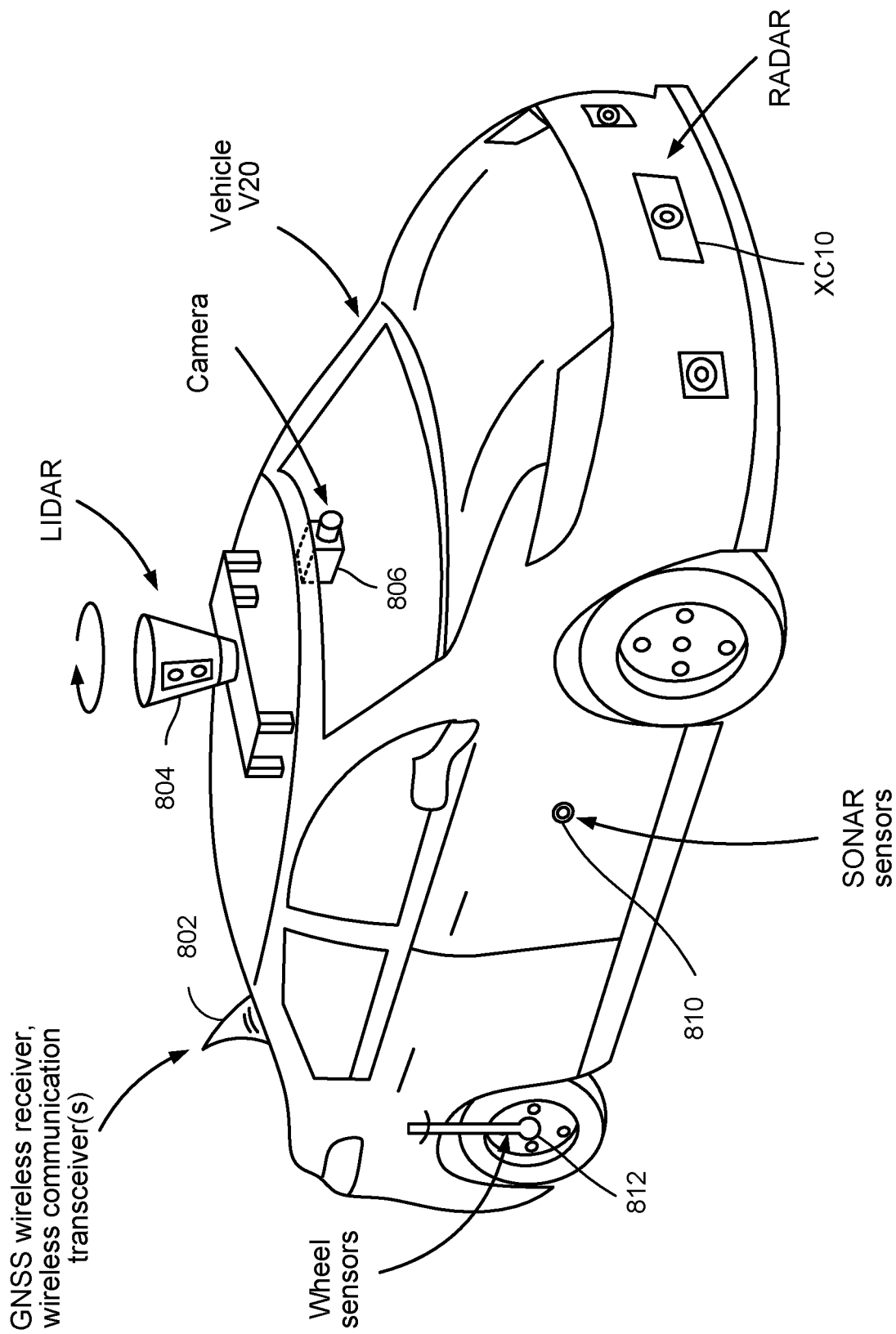
FIG. 10 is a perspective view of an implementation V20 of vehicle V10.

Apparatus A100 may be installed in a vehicle that includes one or more other sensors that may support vehicular automation. FIG. 8 is a perspective view of such an implementation V20 of vehicle V10. Vehicle V20 may include one or more cameras such as rear view mirror-mounted camera 806, front fender-mounted camera (not shown), side mirror-mounted camera (not shown) and a rear camera (not shown, but typically on the trunk, hatch or rear bumper). Vehicle V20 may also have LIDAR 804, for detecting objects and measuring distances to those objects; LIDAR 804 is often roof-mounted, however, if there are multiple LIDAR units 804, they may be oriented around the front, rear and sides of the vehicle. Vehicle V20 may have other various location-related systems such as a GNSS receiver (typically located in the shark fin unit on the rear of the roof, as indicated), various wireless communication interface (such as WAN, WLAN, V2X; typically, but not necessarily, located in the shark fin) 802, and SONAR 810 (typically located on both sides of the vehicle, if present). Various wheel sensors 812 and drive train sensors may also be present, such as tire pressure sensors, accelerometers, gyros, and wheel rotation detection and/or counters. In an embodiment, distance measurements and relative locations determined via various sensors such as LIDAR, radar, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, it may be desired to modify an exact GNSS distance and vector between two GNSS receivers based upon, for example, the relative location of the various car surfaces to the GNSS receiver. It is realized that this list is not intended to be limiting and that FIG. 10 is intended to provide exemplary locations of various sensors in an embodiment of a vehicle comprising an instance of apparatus A100.

Figure 11:
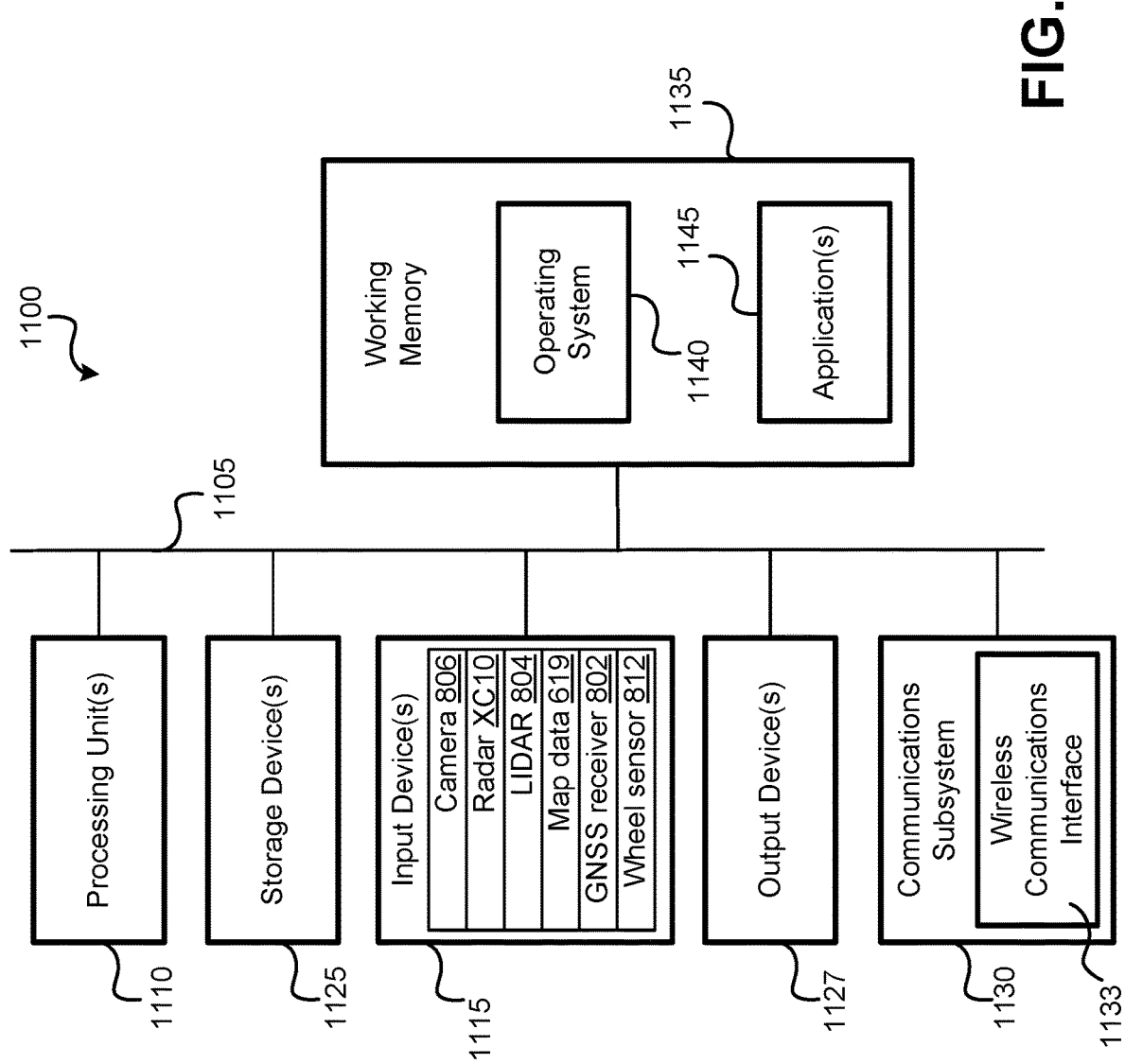
FIG. 11 illustrates an example computer system 1100 in which one or more embodiments may be implemented.

FIG. 11 illustrates an example computer system 1100 that may be utilized with and/or incorporate one or more electronic components of apparatus A100 (e.g., transceiver XC10, processor P10). In certain embodiments, computer system 1100 is deployed in a vehicle (e.g., vehicle V10 or V20). It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

As depicted in FIG. 11, the computer system 1100 may comprise hardware elements that can be communicatively coupled via a bus 1105 (or other wired and/or wireless communication infrastructure, as appropriate). The hardware elements may include one or more processing units 1110, which can include without limitation one or more general-purpose processors, one or more special-purpose processors such as digital signal processor (DSP), graphics acceleration processors, application specific integrated circuits (ASICs), and/or the like. The processing unit(s) 1110 may perform radar processing including, for example, sending and receiving radar signals, applying DFTs, detecting interference from another radar source, and computing the distance and speed of an object based on a received radar signal. Processor P10 may be implemented in whole or in part within processing unit(s) 1110. For example, processor P10 may be implemented at least in part as an application processor, infotainment processor, and/or advanced driver assistance systems (ADAS) processor.

The computer system 1100 may include one or more input devices 1115, which can include without limitation a touch screen, a keyboard, a touch pad, a camera, a microphone, and/or the like; and one or more output devices (not shown), which can include without limitation a display device, speakers, and/or the like.

The computer system 1100 may further include a wireless communication interface 1130, which may include without limitation, a network card, an infrared communication device, a wireless communication device, and/or a chipset (such as a Bluetooth® device, an IEEE 802.11 device, or cellular communication facilities), and/or the like, which may enable the computer system 1100 to communicate with external computer systems or electronic devices. The communication can be carried out via one or more wireless communication antenna(s) (not shown) that send and/or receive wireless signals.

The input devices 1115 may further include one or more sensors. Such sensors may comprise, without limitation, one or more instances of: a radar sensor (e.g., apparatus A100 including transceiver XC10), an inertial sensor (e.g., an accelerometer and/or a gyroscope), a camera, a magnetometer, an altimeter, a microphone, an ultrasonic sensor, a light sensor, and the like, some of which may be used to complement and/or facilitate the radar-related processing described herein.

The computer system 1100 may further include a GNSS receiver 802 operable to receive signals from one or more GNSS satellites using an antenna. The signals can be utilized to complement and/or incorporate the techniques described herein (e.g., to derive a shared time reference for aligning chirp sequences). In certain embodiments, the GNSS signals may be used to determine a geographical location of the computer system 1100, e.g., for use in vehicle navigation.

The computer system 1100 may further include and/or be in communication with a memory 1135. The memory 1135 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In certain embodiments, memory 1135 may store a codebook comprising parameters for transmit waveforms.

The memory 1135 may comprise a non-transitory computer-readable medium storing instructions executable by one or more processors of computer system 1100 (e.g., processing units 1110). Such instructions may be stored as program code, e.g., an operating system 1140, device drivers, executable libraries, or other application programs 1145. The instructions stored in memory 1135 may be configured to cause the processor(s) to perform the radar-related processing described herein. Merely by way of example, one or more procedures described with respect to the method M100 of FIG. 1A discussed above may be implemented as code and/or instructions executable by processing units(s) 1110. In an aspect, then, such code and/or instructions can be used to configure and/or adapt a general purpose computer or other computing device (e.g., processor P10 or P20) to perform one or more operations in accordance with the techniques described herein.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices such as network input/output devices may be employed.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The various elements of an implementation of an apparatus or system as disclosed herein may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 (or another method as disclosed with reference to operation of an apparatus or system described herein), such as a task relating to another operation of a device or system in which the processor is embedded. It is also possible for part of a method as disclosed herein to be performed under the control of one or more other processors.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method of radar measurement as described herein.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus for radar measurement, the apparatus comprising:
 a transceiver; and
 a processor communicatively coupled to the transceiver and configured to:
   transmit, via the transceiver, a first beam having a first frequency characteristic;
   determine a distance between the apparatus and an object based on information from at least one reflection of the first beam;
   transmit, via the transceiver, a second beam having a second frequency characteristic that is different than the first frequency characteristic, wherein the second beam is directed such that an axis of the second beam intersects a ground plane and such that the axis of the second beam is at an elevation angle with respect to the ground plane that is different from an axis of the first beam with respect to the ground plane, wherein the first frequency characteristic is a pulse repetition rate of the first beam, and wherein the second frequency characteristic is a pulse repetition rate of the second beam, and wherein the first frequency characteristic is lower than the second frequency characteristic; and
   determine an ego-velocity of the apparatus based on information from at least one reflection of the second beam.

2. The apparatus according to claim 1, wherein the at least one reflection of the second beam is based on backscatter from a road surface.

3. The apparatus according to claim 1, wherein the transmitting the second beam includes causing the transceiver to direct the second beam such that the axis of the second beam intersects the ground plane at a distance of not more than ten meters from the transceiver.

4. The apparatus according to claim 1, wherein the processor is configured to cause operation of the transceiver to switch between transmitting the first beam and transmitting the second beam a plurality of times per second.

5. The apparatus according to claim 1, wherein the first beam comprises a first series of frequency-modulated pulses, and wherein the second beam comprises a second series of frequency-modulated pulses, and wherein the first frequency characteristic is a characteristic of a pulse of the first series, and wherein the second frequency characteristic is a characteristic of a pulse of the second series.

6. The apparatus according to claim 5, wherein the first frequency characteristic is a bandwidth of a pulse in the first series, and wherein the second frequency characteristic is a bandwidth of a pulse in the second series, and wherein the first frequency characteristic is higher than the second frequency characteristic.

7. The apparatus according to claim 5, wherein the first frequency characteristic is a duration of a pulse in the first series, and wherein the second frequency characteristic is a duration of a pulse in the second series, and wherein the first frequency characteristic is longer than the second frequency characteristic.

8. The apparatus according to claim 1, wherein the transmitting the first beam includes causing the transceiver to direct the first beam such that a direction of the axis of the first beam is not below a horizontal direction.

9. The apparatus according to claim 1, wherein the information from at least one reflection of the second beam includes information from each of a plurality of different patches of a road surface.

10. A method of radar measurement, the method comprising:
    transmitting, via a transceiver, a first beam having a first frequency characteristic;
    calculating a distance between the transceiver and a moving object based on information from at least one reflection of the first beam;
    transmitting, via the transceiver, a second beam having a second frequency characteristic that is different than the first frequency characteristic, wherein the second beam is directed such that an axis of the second beam intersects a ground plane and such that the axis of the second beam is at an elevation angle with respect to the ground plane that is different from the axis of the first beam with respect to the ground plane, wherein the first frequency characteristic is a pulse repetition rate of the first beam, and wherein the second frequency characteristic is a pulse repetition rate of the second beam, and wherein the first frequency characteristic is lower than the second frequency characteristic; and
    calculating an ego-velocity of the transceiver based on information from at least one reflection of the second beam.

11. The method according to claim 10, wherein the at least one reflection of the second beam is based on backscatter from a road surface.

12. The method according to claim 10, wherein the transmitting the second beam includes causing the transceiver to direct the second beam such that the axis of the second beam intersects the ground plane at a distance of not more than ten meters from the transceiver.

13. The method according to claim 10, wherein the method comprises switching operation of the transceiver between transmitting the first beam and transmitting the second beam a plurality of times per second.

14. The method according to claim 10, wherein the first beam comprises a first series of frequency-modulated pulses, and wherein the second beam comprises a second series of frequency-modulated pulses, and wherein the first frequency characteristic is a characteristic of a pulse of the first series, and wherein the second frequency characteristic is a characteristic of a pulse of the second series.

15. The method according to claim 14, wherein the first frequency characteristic is a bandwidth of a pulse in the first series, and wherein the second frequency characteristic is a bandwidth of a pulse in the second series, and wherein the first frequency characteristic is higher than the second frequency characteristic.

16. The method according to claim 14, wherein the first frequency characteristic is a duration of a pulse in the first series, and wherein the second frequency characteristic is a duration of a pulse in the second series, and wherein the first frequency characteristic is longer than the second frequency characteristic.

17. The method according to claim 10, wherein the transmitting the first beam includes causing the transceiver to direct the first beam such that a direction of the axis of the first beam is not below a horizontal direction.

18. The method according to claim 10, wherein the information from at least one reflection of the second beam includes information from each of a plurality of different patches of a road surface.

19. A non-transitory computer-readable storage medium comprising code which, when executed by at least one processor, causes the at least one processor to perform a method of radar measurement, the method comprising:
    transmitting, via a transceiver, a first beam having a first frequency characteristic;
    calculating a distance between the transceiver and a moving object based on information from at least one reflection of the first beam;
    transmitting, via the transceiver, a second beam having a second frequency characteristic that is different than the first frequency characteristic, wherein the second beam is directed such that an axis of the second beam intersects a ground plane and such that the axis of the second beam is at an elevation angle with respect to the ground plane that is different from the axis of the first beam with respect to the ground plane, wherein the first frequency characteristic is a pulse repetition rate of the first beam, and wherein the second frequency characteristic is a pulse repetition rate of the second beam, and wherein the first frequency characteristic is lower than the second frequency characteristic; and
    calculating an ego-velocity of the transceiver based on information from at least one reflection of the second beam.

20. The apparatus according to claim 1, wherein the transmitting the second beam includes varying an elevation angle of the second beam over time, according to information indicating a distance to a nearest vehicle along a facing direction of the transceiver.

21. The method according to claim 10, wherein the transmitting the second beam includes varying an elevation angle of the second beam over time, according to information indicating a distance to a nearest vehicle along a facing direction of the transceiver.

* * * * *